Patented Aug. 16, 1938

2,127,469

UNITED STATES PATENT OFFICE 2,127,469

STRIPPING PROCESS

Charles H. Hempel, Manitowoc, Wis., assignor to Heresite & Chemical Company, Manitowoc, Wis., a corporation of Wisconsin No Drawing. Application June 24, 1937, Serial No. 150,213

4 Claims. (Cl. 87—5)

This invention relates to a stripping process and a solution for such process.

The invention relates particularly to stripping of aluminum or predominantly aluminum alloys which have been coated with varnishes, lacquers or enamels of the phenol-formaldehyde type. The invention is also applicable to stripping other coated metals, but with less reactive metals than aluminum there are other processes which may also be employed.

Aluminum or aluminum alloy materials coated with such phenol-formaldehyde materials are used to a large extent in certain industries, particularly on buckets and spinning spools in the rayon industry. Such articles after service suffer damage to the coating and are rendered unfit for use. The underlying aluminum, however, is still of value and it is desirable to be able to remove the coating without damaging the aluminum. Heretofore no satisfactory and economical method of doing so without seriously damaging the aluminum or aluminum alloy has been found.

According to the present process a stripping solution comprising a mixture of sulfuric and nitric acids, the nitric acid being present preferably in 10-40% by volume of the mixture and the sulfuric acid from 60-90% thereof. Deviations from the range are permissible but the best results are obtained within it.

The 66° Bé. concentration sulfuric acid of commerce may be employed, but best results are obtained by using sulfuric acid having a specific gravity of 1.84. The nitric acid should be of a concentration not below 70%. During the process the solution should be maintained within a temperature range of 65-90° C. The range depends in large part upon the per cent of nitric acid employed, solutions having higher percentages of nitric acid requiring lower temperatures. A temperature of approximately 90° C. is critical, but the lower limit may be varied, although economical results are not obtained below it.

The higher the percentage of nitric acid within the ranges specified, the more rapid is the stripping, but at the same time there is greater difficulty in controlling the temperature of the stripping solution.

The stripping action is exothermic and adequate cooling means must be employed such as a fluid control system, preferably water jacketing.

As an example of the invention, a mixture of 900 parts sulfuric acid, specific gravity 1.84 and 100 parts nitric acid, specific gravity 1.42 is heated to 85° C. in a cast iron tank. Parts to be stripped are immersed and left in the solution until they are completely freed of all coating and are clean and bright. The temperature of the stripping solution is controlled within a range of 80°-90° C. during this time. Heating and cooling of the stripping solution may be effected by surrounding the stripping tanks with a jacket connected to a steam and cold water supply.

What I claim as new and desire to secure by Letters Patent is:

1. The method of removing a baked phenol-formaldehyde coating from a predominantly aluminum base which comprises subjecting the coated base to a bath consisting essentially of 10-40 percent by volume of nitric acid having a concentration of not less than 70%, and 90-60% by volume of concentrated sulfuric acid, while maintaining the temperature of the solution between 65° and 90° C. and continuing the treatment until the base is clean and bright.

2. The method as set forth in claim 1, in which the sulfuric acid has a specific gravity of approximately 1.84.

3. The method as set forth in claim 1, in which the nitric acid has a specific gravity of 1.42 and the temperature is maintained within the range 80-90° C.

4. The method of removing a resinous coating of the phenol-formaldehyde type from a reactive metallic base, which comprises subjecting the coated base to a bath consisting essentially of 10 to 40 percent by volume of nitric acid, having a concentration of not less than 70%, and 90% to 60% by volume of concentrated sulfuric acid, while maintaining the temperature of the solution between 65° C. and 90° C., and continuing the treatment until the base is clean and bright.

CHARLES H. HEMPEL.